United States Patent
Tsuchida et al.

(10) Patent No.: US 11,194,977 B2
(45) Date of Patent: *Dec. 7, 2021

(54) MERCHANDISE READING APPARATUS AND MERCHANDISE INFORMATION PROCESSING APPARATUS

(71) Applicant: TOSHIBA TEC KABUSHIKI KAISHA, Tokyo (JP)

(72) Inventors: Sunao Tsuchida, Mishima (JP); Sadatoshi Oishi, Fuji (JP); Jun Yaginuma, Izunokuni (JP); Seiya Kishimoto, Shinagawa (JP); Yuki Koike, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 16/848,886

(22) Filed: Apr. 15, 2020

(65) Prior Publication Data

US 2020/0242311 A1    Jul. 30, 2020

Related U.S. Application Data

(63) Continuation of application No. 16/030,885, filed on Jul. 10, 2018, now Pat. No. 10,657,336.

(30) Foreign Application Priority Data

Aug. 7, 2017    (JP) .............................. JP2017-152661

(51) Int. Cl.
*G06K 7/10*        (2006.01)

(52) U.S. Cl.
CPC .................... *G06K 7/10297* (2013.01); *G06K 2007/10504* (2013.01)

(58) Field of Classification Search
CPC ................. G06K 7/10297; G06K 2007/10504
See application file for complete search history.

(56) References Cited

U.S. PATENT DOCUMENTS

| | | |
|---|---|---|
| 5,530,702 A | 6/1996 | Palmer et al. |
| 7,753,270 B2 | 7/2010 | Ishida |
| 7,839,276 B2 | 11/2010 | Rodgers |

(Continued)

FOREIGN PATENT DOCUMENTS

| | | | |
|---|---|---|---|
| JP | 2009010865 A | * | 1/2009 |
| JP | 2010-103421 | | 5/2010 |

(Continued)

OTHER PUBLICATIONS

Non-Final Office Action for U.S. Appl. No. 16/030,885 dated Oct. 3, 2019.

(Continued)

*Primary Examiner* — Christle I Marshall
(74) *Attorney, Agent, or Firm* — Amin, Turocy & Watson, LLP

(57) ABSTRACT

According to one embodiment, a merchandise reading apparatus is equipped with a storage chamber formed of a radio wave shielding member and a reading apparatus which reads information of a radio tag from merchandise attached with the radio tag and stored in the storage chamber, and at least a part of the storage chamber is formed of a light transmitting member.

18 Claims, 1 Drawing Sheet

(56) References Cited

U.S. PATENT DOCUMENTS

| | | | |
|---|---|---|---|
| 9,646,183 B2 | 5/2017 | Hirono | |
| 9,858,769 B2 | 1/2018 | Hattori | |
| 10,185,852 B2 | 1/2019 | Yaginuma et al. | |
| 10,657,336 B2 * | 5/2020 | Tsuchida | G06K 7/10297 |
| 2017/0265338 A1 | 9/2017 | Kim et al. | |
| 2018/0032770 A1 | 2/2018 | Yaginuma et al. | |
| 2018/0070483 A1 | 3/2018 | Ohishi et al. | |
| 2019/0042810 A1* | 2/2019 | Tsuchida | G06K 7/10297 |
| 2019/0172296 A1 | 6/2019 | Zhang et al. | |
| 2019/0244069 A1 | 8/2019 | Oishi et al. | |

FOREIGN PATENT DOCUMENTS

| | | |
|---|---|---|
| JP | 2012-194195 | 10/2012 |
| JP | 2013-163579 | 8/2013 |
| JP | 2016-162177 | 9/2016 |
| WO | 2008/117499 | 10/2008 |

OTHER PUBLICATIONS

Chinese Office Action for Chinese Patent Application No. 201810835624.3 dated Apr. 19, 2021.
Japanese Office Action for Japanese Patent Application No. 2017-152661 dated Mar. 23, 2021.
U.S. Appl. No. 16/030,885, filed Jul. 10, 2018.

* cited by examiner

MERCHANDISE READING APPARATUS AND MERCHANDISE INFORMATION PROCESSING APPARATUS

CROSS-REFERENCE TO RELATED APPLICATION

This application is a Continuation of application Ser. No. 16/030,885 filed on Jul. 10, 2018, the entire contents of which are incorporated herein by reference.

This application is based upon and claims the benefit of priority from Japanese Patent Application No. P2017-152661, filed Aug. 7, 2017, the entire contents of which are incorporated herein by reference.

FIELD

Embodiments described herein relate to a merchandise reading apparatus and a merchandise information processing apparatus and methods related thereto.

BACKGROUND

A merchandise reading apparatus is known which collectively accommodates merchandise attached with an RFID tag, collectively reads information of the merchandise from the RFID tag, and transmits the read information to an information processing apparatus which manages the information of the merchandise. Such a merchandise reading apparatus can be used in various cases, for example, merchandise management in the warehouse, merchandise management in the medical field, and merchandise management in the store.

However, in the merchandise reading apparatus of the related art, the periphery thereof is surrounded by opaque metal walls to prevent the leakage of radio waves to the outside. Therefore, since the interior is not visible, it is not easy to recognize whether merchandise is present in the merchandise reading apparatus, and the reading of an RFID tag can hardly be executed after confirming what kind of merchandise is present in the merchandise reading apparatus.

Accordingly, it is desired improvement to prevent goods or a goods basket used for accommodating goods from being left behind.

DETAILED DESCRIPTION

An exemplary embodiment provides a merchandise reading apparatus and a merchandise information processing apparatus which are capable of confirming merchandise placed inside the merchandise reading apparatus.

In general, according to one embodiment, a merchandise reading apparatus includes a storage chamber and a reading apparatus. The storage chamber is formed of a radio wave shielding member. The reading apparatus reads information of a radio tag from merchandise attached with the radio tag and stored in the storage chamber. In the merchandise reading apparatus, at least a part of the storage chamber is formed of a light transmitting member.

According to another embodiment, a merchandise processing method involves reading information of a radio tag attached to merchandise and stored in a storage chamber, the storage chamber comprising a radio wave shielding member and a light transmitting member; and registering the merchandise from the information read from the radio tag.

Hereinafter, an exemplary embodiment will be described with reference to the drawings.

Figure 1:
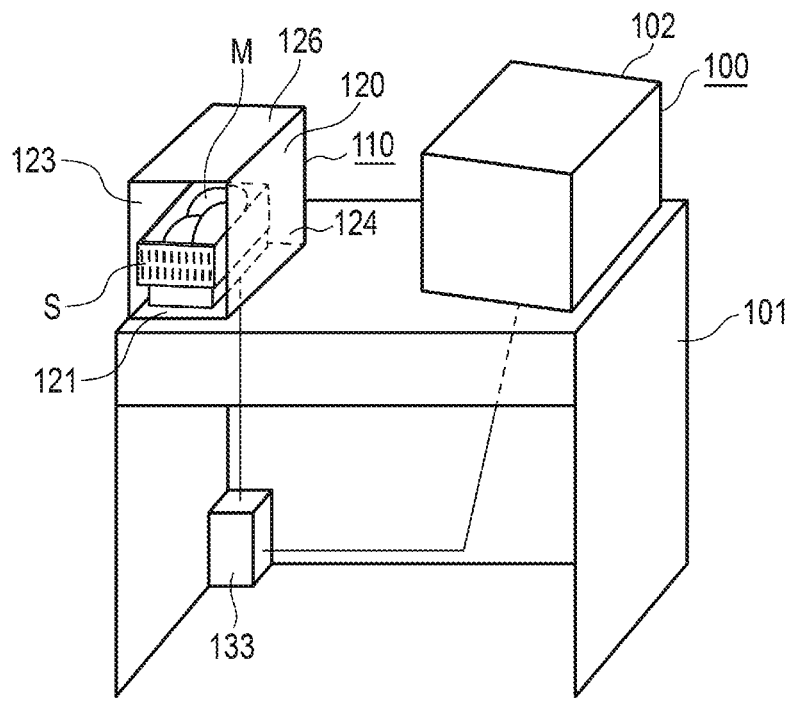
FIG. 1 is an external perspective view illustrating a configuration of a merchandise information processing apparatus according to an embodiment.
Figure 2:
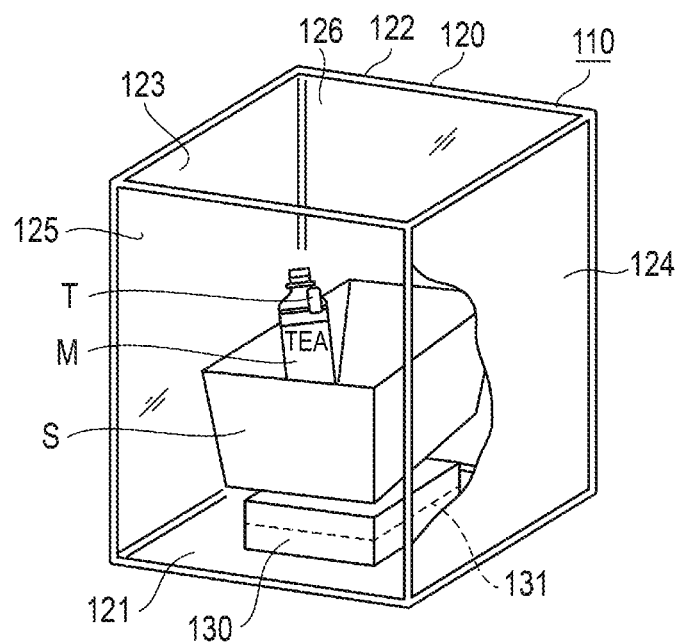
FIG. 2 is an external perspective view illustrating a schematic configuration of a merchandise reading apparatus.

FIG. 1 is an external perspective view illustrating a configuration of a merchandise information processing apparatus 100 to be used for sales registration of goods and inspection work at warehouse or the like according to an embodiment, and FIG. 2 is an external perspective view illustrating a merchandise reading apparatus incorporated in the merchandise information processing apparatus 100 in a partially broken manner. Incidentally, reference symbol "M" indicates goods, and reference symbol "T" indicates an RFID tag (Radio Frequency IDentifier) as a radio tag attached to each of goods. The RFID tag T includes a chip including a memory unit capable of memorizing tag identification information such as a tag ID on a resin base, and an antenna.

The merchandise information processing apparatus 100 is installed to be used at a store such as a supermarket and a clothing store, and at warehouse. The merchandise information processing apparatus 100 includes a counter 101. In a main body 102 of the merchandise information processing apparatus 100 is provided with a display unit or an input unit.

On the left side of the main body 102, a merchandise reading apparatus 110 is included to read an RFID tag T attached to each of goods M.

The merchandise reading apparatus 110 is connected to the merchandise information processing apparatus 100, and outputs (transmits) various kinds of information obtained by reading from the RFID tag T attached to various goods to the merchandise information processing apparatus 100.

FIG. 2 is a perspective view illustrating the merchandise reading apparatus 110 in a partially broken manner. The merchandise reading apparatus 110 includes a rectangular parallelepiped storage chamber 120 forming the main exterior of the merchandise reading apparatus 110 and a placing table 130 which is placed on a bottom plate 121 (to be described below) of the storage chamber 120 and placed with a goods basket S thereon.

The storage chamber 120 includes the bottom plate 121 fixed to the counter 101, a back wall member 122, a left wall member 123, a right wall member 124, and an opening and closing lid 125 which are provided upright on each side of the bottom plate 121, and a ceiling plate 126 disposed on a top. These bottom plate 121, back wall member 122, left wall member 123, right wall member 124, opening and closing lid 125, and ceiling plate 126 are formed with a flat plate to be in a rectangular shape, respectively, thereby forming a rectangular parallelepiped shape as a whole. With the opening and closing lid 125, a customer can perform putting-in and taking-out the goods basket S by opening and closing the lid.

The bottom plate 121, the back wall member 122, the left wall member 123, and the right wall member 124 are formed of a radio wave reflecting member such as a metal plate serving as an opaque radio wave shielding member, or formed with a radio wave absorbing material which absorbs radio waves. Incidentally, the opening and closing lid 125 and the ceiling plate 126 are formed of a light transmitting member which shields the radio waves. As an example of the light transmitting member shielding the radio waves, a film or glass covered with a transparent conductive film on the surface thereof such as an ITO film (tin-doped indium oxide film) or a silver nanowire film, a film or glass patterned with a silver nano ink, and the like can be included.

The placing table 130 is formed of an insulative (radio wave transparent) plate-shaped member made of wood or glass, and is supported to have a predetermined gap with the storage chamber 120.

The interior of the placing table 130 is provided with an RFID antenna 131 used to read and write information of the RFID tag T. Here, as the RFID antenna 131, an antenna device for both transmission and reception is used which accommodates a planar patch antenna in a rectangular parallelepiped casing. The RFID antenna 131 is connected to a reader/writer 133 which communicates the RFID tag T to perform reading information memorized in the memory unit of the RFID tag T and writing information to the memory unit. Incidentally, the reading apparatus is constituted by the RFID antenna 131 and the reader/writer 133.

The merchandise information processing apparatus 100 having a configuration as described above is used as follows. An RFID tag T is attached to each of goods M when shipping from a factory or the like, or before arranging goods in a store or the like. After the RFID tag T is attached to the goods M, a user picks up the goods M and accommodates it into a goods basket S. The user places the goods basket Sin the merchandise reading apparatus 110 of the merchandise information processing apparatus 100 at the stage of inspection. The customer closes the opening and closing lid 125, and instructs an inspection operation through a liquid crystal display panel provided on the main body 102.

The merchandise reading apparatus 110 starts a reading operation of an RFID tag T. Based on a signal from the reader/writer 133, radio waves are output from the RFID antenna 131, thereby performing communication (reading and writing) with each of the RFID tags T in the goods basket S. After reading all the RFID tags T, reading completion is displayed by the display unit, and thus displaying of inspection completion is performed.

After the inspection is completed, the user opens the opening and closing lid 125, and takes out the goods basket S from the merchandise reading apparatus 110, thereby completing the inspection. At that time, since the opening and closing lid 125 and the ceiling plate 126 of the storage chamber 120 are transparent, the customer can recognize the goods basket S placed in the merchandise reading apparatus 110, so that the goods basket S is hardly left behind. In addition, during inspection, it is possible to confirm what kind of goods is to be inspected. From the start, if the goods are not the goods to be inspected, it is possible to remove the goods from the goods basket.

According to the merchandise information processing apparatus 100 of the exemplary embodiment, since a part of the storage chamber 120 is transparent, after accounting, it is possible to prevent that the customer leaves the goods or the goods basket S behind.

Incidentally, although the storage chamber 120 described above has a rectangular parallelepiped shape, the shape is not limited thereto. In addition, among the bottom plate 121, the back wall member 122, the left wall member 123, the right wall member 124, the opening and closing lid 125, and the ceiling plate 126 constituting the storage chamber 120, which member to be formed of an opaque radio wave shielding member or a light transmitting member shielding the radio waves can be appropriately changed depending on the positional relationship with the main body 102 of the merchandise information processing apparatus 100. For example, if plural merchandise information processing apparatuses 100 are disposed to be adjacent to each other on both sides, only the left wall member 123 and the right wall member 124 may be formed of an opaque radio wave shielding member, and if the user is present on the back side of the merchandise information processing apparatus 100, in order that the user easily recognizes the goods basket S being left behind, the back wall member 122 may be formed of a light transmitting member shielding the radio waves.

In addition, an opening may be provided instead of the opening and closing lid 125.

Further, a merchandise information processing apparatus used for inspection is described as an example, however, the apparatus may be applied to an accounting apparatus for selling merchandise at a store, for example, in addition to warehouse.

While some embodiments have been described, these embodiments are merely examples, and are not intended to limit the scope of the exemplary embodiment. These novel embodiments may be implemented in various other forms, and various omissions, replacements, and modifications may be made without departing from the scope and spirit of the exemplary embodiment. These embodiments and the modifications are included in the scope and spirit of the exemplary embodiment, and are included in the exemplary embodiment described in the claims and their equivalents.

What is claimed is:

1. A merchandise reading apparatus, comprising:
a storage chamber comprising a radio wave shielding member and a light transmitting member that comprises a transparent conductive film laminated on a transparent material, wherein the light transmitting member is located at a position of at least one face of the storage chamber; and
a reading apparatus configured to read information of a radio tag attached to merchandise and stored in the storage chamber.

2. The apparatus according to claim 1, wherein
the storage chamber has a rectangular parallelepiped shape with six faces, and
at least one face of the six faces comprises the light transmitting member.

3. The apparatus according to claim 2, wherein
of the six faces, one face is an insertion face through which the merchandise is inserted and comprises the light transmitting member.

4. The apparatus according to claim 1, wherein
the radio wave shielding member comprises a metal plate.

5. The apparatus according to claim 1, wherein
the radio wave shielding member comprises a radio wave absorbing material that absorbs radio waves.

6. The apparatus according to claim 1, wherein
the light transmitting member comprises a glass covered with a transparent conductive film.

7. The apparatus according to claim 1, wherein
the transparent conductive film comprises a tin-doped indium oxide film.

8. The apparatus according to claim 1, wherein
the transparent conductive film comprises a silver nanowire film.

9. The apparatus according to claim 1, wherein
the transparent conductive film comprises a silver nano ink.

10. The apparatus according to claim 3, wherein the insertion face comprises a tin-doped indium oxide film.

11. A merchandise information processing apparatus, comprising:
a reading apparatus configured to read information of a radio tag attached to merchandise and stored in a storage chamber, the storage chamber comprising a radio wave shielding member and a light transmitting member that comprises a transparent conductive film laminated on a transparent material, wherein the light transmitting member is located at a position of at least one face of the storage chamber; and
a data processing apparatus configured to perform registration of the merchandise from the information of the radio tag read by the reading apparatus.

12. The apparatus according to claim 11, wherein the storage chamber has a rectangular parallelepiped shape with six faces, and
at least one face of the six faces comprises the light transmitting member.

13. The apparatus according to claim 12, wherein of the six faces, one face is an insertion face through which the merchandise is inserted and comprises the light transmitting member.

14. The apparatus according to claim 11, wherein the radio wave shielding member comprises a metal plate.

15. The apparatus according to claim 11, wherein the radio wave shielding member comprises a radio wave absorbing material that absorbs radio waves.

16. The apparatus according to claim 11, wherein the light transmitting member comprises a glass covered with a transparent conductive film, a tin-doped indium oxide film, or a silver nanowire film.

17. A merchandise processing method, comprising:
reading information of a radio tag attached to merchandise and stored in a storage chamber, the storage chamber comprising a radio wave shielding member and a light transmitting member that comprises a transparent conductive film laminated on a transparent material, wherein the light transmitting member is located at a position of at least one face of the storage chamber; and
registering the merchandise from the information read from the radio tag.

18. The method according to claim 17, wherein the storage chamber has a rectangular parallelepiped shape with six faces, and
at least one face of the six faces comprises the light transmitting member.

* * * * *